United States Patent
Shibuya et al.

(10) Patent No.: US 10,086,901 B2
(45) Date of Patent: Oct. 2, 2018

(54) SADDLE RIDING TYPE VEHICLE (71) Applicant: YAMAHA HATSUDOKI KABUSHIKI KAISHA, Iwata-shi, Shizuoka (JP)

(72) Inventors: Yu Shibuya, Shizuoka (JP); Nobuo Hara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 75 days.

(21) Appl. No.: 15/128,459

(22) PCT Filed: Mar. 13, 2015

(86) PCT No.: PCT/JP2015/057565
§ 371 (c)(1),
(2) Date: Sep. 23, 2016

(87) PCT Pub. No.: WO2015/146653
PCT Pub. Date: Jan. 10, 2015

(65) Prior Publication Data
US 2017/0106936 A1   Apr. 20, 2017

(30) Foreign Application Priority Data
Mar. 24, 2014   (JP) .................................. 2014-060815

(51) Int. Cl.
B62K 5/05   (2013.01)
B62K 25/04   (2006.01)
(Continued)

(52) U.S. Cl.
CPC ............. *B62K 25/04* (2013.01); *B62K 5/027* (2013.01); *B62K 5/05* (2013.01); *B62K 5/08* (2013.01);
(Continued)

(58) Field of Classification Search
CPC ...................................................... B62K 5/027
See application file for complete search history.

(56) References Cited

U.S. PATENT DOCUMENTS

| | | | | |
|---|---|---|---|---|
| 6,367,824 | B1 * | 4/2002 | Hayashi | B62K 5/05 280/124.103 |
| 7,487,985 | B1 * | 2/2009 | Mighell | B62K 5/027 180/210 |

(Continued)

FOREIGN PATENT DOCUMENTS

| | | |
|---|---|---|
| EP | 1 363 794 B1 | 5/2006 |
| FR | 2 995 255 A1 | 3/2014 |

(Continued)

OTHER PUBLICATIONS

Official Communication issued in International Patent Application No. PCT/JP2015/057565, dated Jun. 2, 2015.

*Primary Examiner* — Truc M Do
(74) *Attorney, Agent, or Firm* — Keating and Bennett, LLP (57) ABSTRACT

A saddle riding type vehicle includes a linkage, a lock, a controller, and an operator and prevents operation of a linkage upon fulfillment of a prescribed condition and allows the rider's intention to be more easily and accurately reflected in the control of the vehicle. The linkage connects a pair of front wheels to a vehicle body frame. The lock locks the linkage by preventing operation of the linkage and unlocks the linkage by allowing the linkage to operate. The operator continues to output an operation signal to the controller while an operation is input by the rider. The controller controls the lock to lock the linkage if the operation signal is input upon fulfillment of a locking condition that allows the linkage to be locked.

13 Claims, 7 Drawing Sheets

(51) Int. Cl.
  *B62K 5/027* (2013.01)
  *B62K 5/08* (2006.01)
  *B62K 5/10* (2013.01)
  *B62K 5/00* (2013.01)

(52) U.S. Cl.
  CPC .......... *B62K 5/10* (2013.01); *B62K 2005/001* (2013.01); *B62K 2025/044* (2013.01); *B62K 2025/047* (2013.01)

(56) References Cited

U.S. PATENT DOCUMENTS

| | | | | |
|---|---|---|---|---|
| 7,591,337 | B2* | 9/2009 | Suhre | B60G 3/20 |
| | | | | 180/210 |
| 9,027,692 | B2* | 5/2015 | Nakashima | B62K 11/10 |
| | | | | 180/220 |
| 9,751,507 | B2* | 9/2017 | Seto | B60T 8/17554 |
| 9,840,299 | B2* | 12/2017 | Takano | B62K 5/10 |
| 9,840,300 | B2* | 12/2017 | Ohno | B60G 17/0155 |
| 9,862,448 | B2* | 1/2018 | Hirakawa | B62K 5/10 |
| 9,873,474 | B2* | 1/2018 | Ohno | B62K 5/10 |
| 9,878,757 | B2* | 1/2018 | Inomori | B62K 11/04 |
| 2005/0167174 | A1 | 8/2005 | Marcacci | |
| 2005/0177285 | A1 | 8/2005 | Honda | |
| 2009/0152940 | A1* | 6/2009 | Mercier | B60T 8/1706 |
| | | | | 303/113.2 |
| 2009/0299565 | A1 | 12/2009 | Hara et al. | |
| 2009/0302557 | A1* | 12/2009 | Hara | B62K 21/08 |
| | | | | 280/5.512 |
| 2010/0025944 | A1* | 2/2010 | Hara | B62D 9/02 |
| | | | | 280/5.509 |
| 2010/0059018 | A1 | 3/2010 | Akatsuka | |
| 2010/0096204 | A1* | 4/2010 | Mosey | B62K 3/16 |
| | | | | 180/210 |
| 2010/0126789 | A1* | 5/2010 | Scragg | B62K 5/01 |
| | | | | 180/208 |
| 2011/0060494 | A1* | 3/2011 | Tsujii | B60G 21/106 |
| | | | | 701/31.4 |
| 2011/0148052 | A1* | 6/2011 | Quemere | B60G 17/005 |
| | | | | 280/6.15 |
| 2012/0181765 | A1 | 7/2012 | Hill et al. | |
| 2012/0232758 | A1 | 9/2012 | Mercier | |
| 2013/0193656 | A1 | 8/2013 | Itoh et al. | |
| 2013/0214503 | A1* | 8/2013 | Chiuppani | B60G 5/025 |
| | | | | 280/124.103 |
| 2014/0049021 | A1* | 2/2014 | Huang | B62D 9/04 |
| | | | | 280/267 |
| 2014/0361502 | A1* | 12/2014 | Kitamura | B62K 5/10 |
| | | | | 280/5.515 |

FOREIGN PATENT DOCUMENTS

| | | |
|---|---|---|
| JP | 05-139357 A | 6/1993 |
| JP | 2005-198437 A | 7/2005 |
| JP | 2005-313876 A | 11/2005 |
| JP | 2009-286266 A | 12/2009 |
| JP | 2010-084757 A | 4/2010 |
| JP | 2011-057018 A | 3/2011 |
| JP | 2011-195100 A | 10/2011 |
| JP | 2012-025370 A | 2/2012 |

* cited by examiner

SADDLE RIDING TYPE VEHICLE

BACKGROUND OF THE INVENTION

1. Field of the Invention

The present invention relates to saddle riding type vehicles and more particularly to a saddle riding type vehicle including a pair of front wheels.

2. Description of the Related Art

An example of a saddle riding type vehicle is a three-wheeled vehicle including a pair of front wheels and a linkage that connects the pair of front wheels to a vehicle body frame. The three-wheeled vehicle is able to turn while leaning by the operation of the linkage.

JP 2005-313876 A discloses an anti-roll device for a three-wheeled vehicle. The anti-roll device includes a brake disk provided integrally with one element of the linkage and a caliper attached to a vehicle body frame. In the anti-roll device, the caliper is used to fix the brake disk to the vehicle body frame. In this way, the operation of the linkage is prevented. This prevents a rolling motion of the vehicle.

JP 2009-286266 A discloses a saddle riding type vehicle. The saddle riding type vehicle includes a support, a lock, a sensor, and a controller. The support supports a pair of wheels so that the wheels are able move up and down relative to the vehicle body. The lock connects to the support to prevent the movement of the pair of wheels in the vertical direction. The sensor detects the state of the vehicle. The controller controls the lock based on a detection result from the sensor. The vertical movement of the pair of wheels is automatically prevented or allowed by the controller. Therefore, the operation of the support is prevented quickly when a prescribed condition is established.

However, when the operation of the support is automatically controlled, the rider's intention cannot completely be taken into account. For example, the operation of the support may be prevented against the rider's intention. The condition in which the operation of the support is prevented must be set appropriately in order to avoid this inconvenience. This may however complicate the way of setting the condition or the like.

SUMMARY OF THE INVENTION

Preferred embodiments of the present invention provide a saddle riding type vehicle that is able to quickly prevent the operation of a linkage upon fulfillment of a prescribed condition in accordance with the rider's intention.

A saddle riding type vehicle according to a first preferred embodiment of the present invention includes a vehicle body frame, a pair of front wheels, a linkage, a lock, a controller, and an operator. The linkage connects the pair of front wheels to the vehicle body frame. The lock locks the linkage by preventing operation of the linkage and unlocks the linkage by allowing the linkage to operate. The controller is configured or programmed to control locking and unlocking of the linkage by the lock. The operator continues to output an operation signal to the controller while operation by the rider is input. The controller controls the lock to lock the linkage if a locking condition that allows the linkage to be locked is fulfilled when the operation signal is input.

The operator is provided so that the rider's intention is readily and accurately reflected in the control and operation of the vehicle. If the locking condition is already established when the rider operates the operator, the linkage is switched to its locked state from its unlocked state in response to the rider's operation of the operator. The operation signal continues to be output while the operator is being operated. Therefore, if the rider has operated the operator before the locking condition is fulfilled (or the locking condition is not yet established when the rider operates the operator), the linkage is switched quickly from its unlocked state to its locked state when the locking condition is fulfilled.

According to a preferred embodiment of the present invention, the controller is configured or programmed to keep the linkage in an unlocked state via the lock if the operation signal input upon the present fulfillment of the locking condition has continuously been input since the previous fulfillment of the locking condition.

Accordingly, the rider is able to be urged to stop operating the operator after the linkage is locked. The rider's intention is more easily and accurately reflected in the control and operation of the vehicle.

According to a preferred embodiment of the present invention, the saddle riding type vehicle further includes a locking notifier that notifies the rider that the linkage is locked by the lock.

Accordingly, the rider is made aware of the locked state of the linkage. A way of notifying the rider of the locked state of the linkage includes, for example, to provide an indication using a visual indicator or an audio indicator using a speaker.

The saddle riding type vehicle according to a preferred embodiment of the present invention further includes a condition fulfillment notifier that notifies the rider of fulfillment of the locking condition.

Accordingly, the rider is made aware of fulfillment of the locking condition. Therefore, if, for example, the operator has not been operated before fulfillment of the locking condition, the rider is notified to operate the operator at the appropriate time.

According to a preferred embodiment of the present invention, the saddle riding type vehicle further includes a detector that detects a vehicle state. The controller is configured or programmed to include a locking condition determiner, a signal input determiner, and a locking controller. The locking condition determiner determines whether the locking condition is fulfilled based on the vehicle state detected by the detector. The signal input determiner determines whether the operation signal is input while the locking condition is fulfilled. The locking controller is configured or programmed to control the lock to lock the linkage if the operation signal is input while the locking condition is fulfilled.

According to a preferred embodiment of the present invention, the saddle riding type vehicle further includes an abnormality determiner. The abnormality determiner determines whether the detector has an abnormality. The locking condition determiner does not determine whether the locking condition is fulfilled if the detector has an abnormality.

Accordingly, the fulfillment of the locking condition is more accurately determined.

According to a preferred embodiment of the present invention, the signal input determiner includes an input period determiner. The input period determiner determines whether the operation signal input upon the present fulfillment of the locking condition has continuously been input since the previous fulfillment of the locking condition. The locking controller is configured or programmed to include an unlocking maintainer that keeps the linkage in an unlocked state via the lock if the operation signal input upon the present fulfillment of the locking condition has continuously been input since the previous fulfillment of the locking condition.

According to a preferred embodiment of the present invention, the saddle riding type vehicle further includes a plurality of the detectors. The locking condition determiner determines whether the locking condition is fulfilled based on vehicle states detected by the plurality of detectors.

Accordingly, the precision of detecting the vehicle states improves.

According to a preferred embodiment of the present invention, the plurality of detectors include a state detector that detects a state of the linkage, a throttle opening degree detector that detects a throttle opening degree, and a vehicle speed detector that detects a vehicle speed.

According to a preferred embodiment of the present invention, the plurality of detectors further include an engine speed detector that detects an engine speed.

According to a preferred embodiment of the present invention, the plurality of detectors further include a vehicle speed change rate detector that detects a vehicle speed change rate.

According to a preferred embodiment of the present invention, the vehicle speed change rate detector outputs a difference between a vehicle speed detected by the vehicle speed detector at a first time point and a vehicle speed detected by the vehicle speed detector at a second time point as the vehicle speed change rate.

Accordingly, a vehicle speed change rate is obtained more easily than the case of obtaining it by differentiating a vehicle speed.

According to a preferred embodiment of the present invention, the saddle riding type vehicle further includes a damper. The damper damps vibrations in opposite phases generated in the pair of front wheels. The lock locks the linkage by preventing operation of the damper and unlocks the linkage by allowing the damper to operate.

Accordingly, an additional lock is not necessary. Therefore, a compact saddle riding type vehicle is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Now, saddle riding type vehicles according to preferred embodiments of the present invention will be described in conjunction with the accompanying drawings in which the same or corresponding portions are designated by the same reference characters and their description will not be repeated. Note that the saddle riding type vehicle may be a scooter type vehicle, for example.

Figure 1:
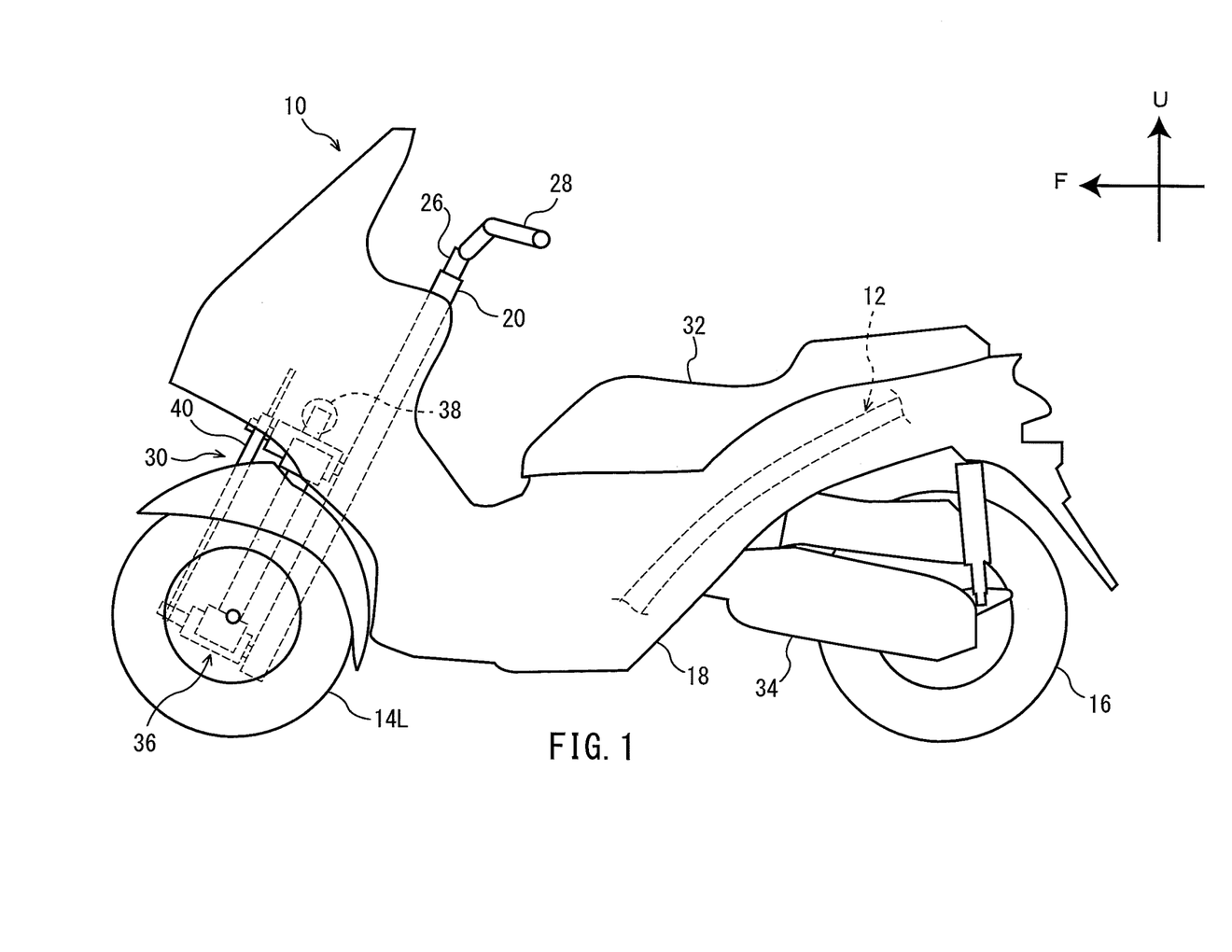
FIG. 1 is a left side view of a general structure of a saddle riding type vehicle according to a preferred embodiment of the present invention.
Figure 2:
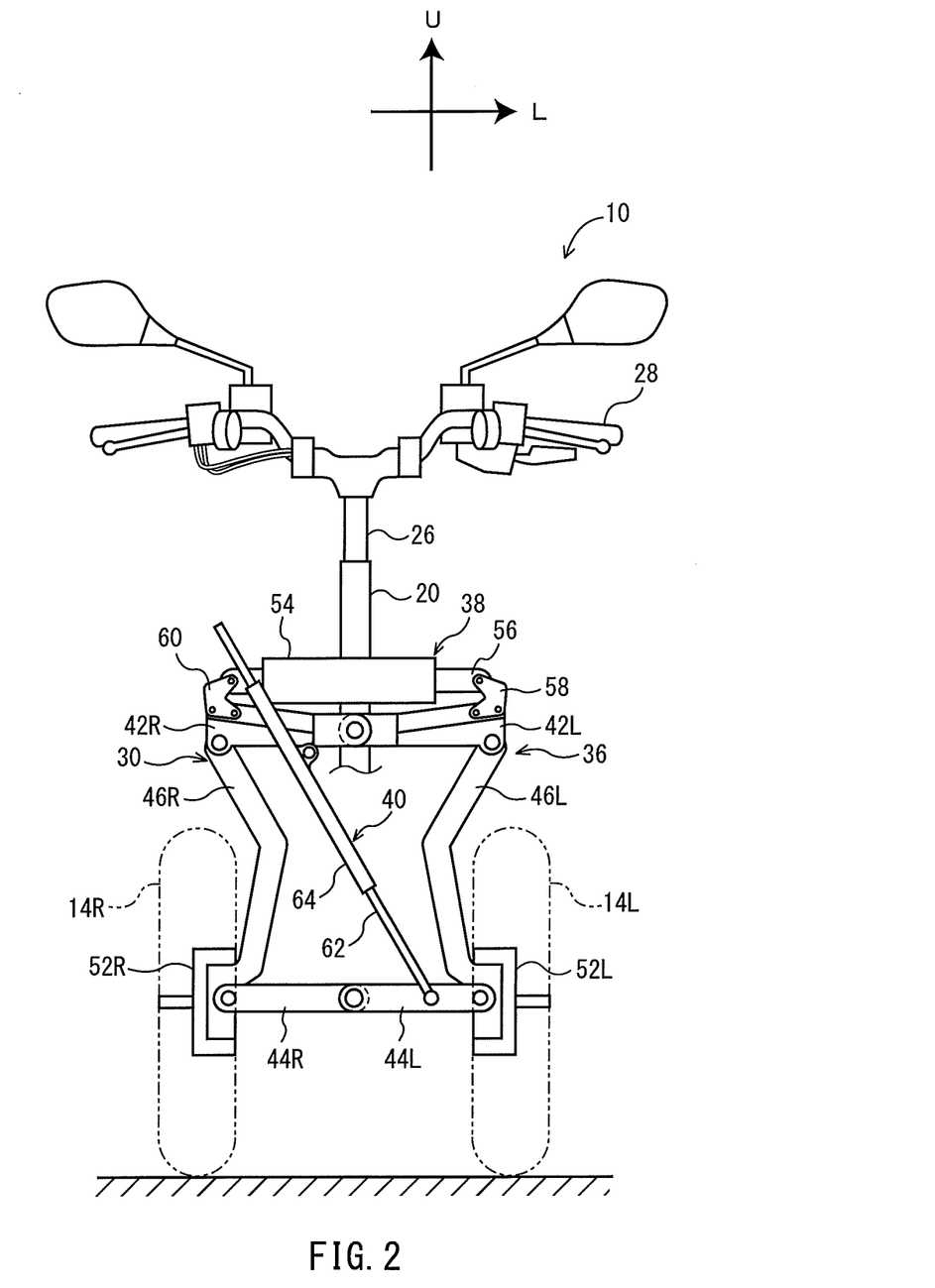
FIG. 2 is a front view of a general structure of a linkage.

FIG. 1 is a left side view of a general structure of a saddle riding type vehicle 10 according to a preferred embodiment of the present invention. FIG. 2 is a front view of a general structure of a linkage provided in the saddle riding type vehicle 10. In the following description, the front, back, left, and right refer to these positions as seen by the rider seated on a seat 32 of the saddle riding type vehicle 10. In FIG. 1, the arrow F indicates a forward direction of the saddle riding type vehicle 10 and the arrow U indicates an upward direction of the saddle riding type vehicle 10. In FIG. 2, the arrow L indicates a leftward direction of the saddle riding type vehicle 10 and the arrow U indicates the upward direction of the saddle riding type vehicle 10.

As shown in FIGS. 1 and 2, the saddle riding type vehicle 10 includes a vehicle body frame 12, a pair of front wheels 14L and 14R, and a rear wheel 16.

As shown in FIG. 1, the vehicle body frame 12 is covered with a vehicle cover 18. As shown in FIG. 1, the vehicle body frame 12 includes a head pipe 20.

As shown in FIG. 1, the head pipe 20 is provided at a front portion of the vehicle body frame 12. As shown in FIGS. 1 and 2, the head pipe 20 includes a steering shaft 26 inserted therethrough. As shown in FIGS. 1 and 2, the steering shaft 26 includes a handle 28 at its upper end.

As shown in FIG. 1, a front wheel support 30 is provided in front of the head pipe 20. As shown in FIG. 2, the front wheel support 30 supports the pair of front wheels 14L and 14R. The front wheel support 30 will be described in detail below.

As shown in FIG. 1, the rear wheel 16 is provided below the seat 32. The seat 32 is provided above the vehicle body frame 12. The driving force of an engine 94 (see FIG. 5) is transmitted to rotate the rear wheel 16.

Referring to FIG. 2, the front wheel support 30 will be described. The front wheel support 30 includes a linkage 36, a suspension 38, and a damper 40.

The linkage 36 connects the pair of front wheels 14L and 14R to the vehicle body frame 12 (for example, to a front frame provided in front of the head pipe 20). The linkage 36 includes an upper left arm 42L, an upper right arm 42R, a lower left arm 44L, a lower right arm 44R, a left knuckle arm 46L, and a right knuckle arm 46R.

One of the upper left arm 42L and the upper right arm 42R is able to swing relative to the other around an axial line through a swing center that extends in the front-back direction of the vehicle. The lower left arm 44L is provided under the upper left arm 42L. The lower right arm 44R is provided under the upper right arm 42R. One of the lower left arm 44L and the lower right arm 44R is able to swing relative to the other around an axial line through a swing center that extends in the front-back direction of the vehicle.

The left knuckle arm 46L extends in the vertical direction of the vehicle to connect a left end of the upper left arm 42L and a left end of the lower left arm 44L. The left knuckle arm 46L is able to swing relative to the upper left arm 42L and the lower left arm 44L around an axial line through a swing center that extends in the front-back direction of the vehicle. Therefore, the left knuckle arm 46L is able to move in the vertical direction.

The right knuckle arm 46R extends in the vertical direction of the vehicle to connect a right end of the upper right arm 42R and a right end of the lower right arm 44R. The right knuckle arm 46R is able to swing relative to the upper right arm 42R and the lower right arm 44R around an axial line through a swing center that extends in the front-back direction of the vehicle. Therefore, the right knuckle arm 46R is able to move in the vertical direction.

At a lower end of the left knuckle arm 46L, a front wheel support member 52L is able to swing around an axial line through a swing center that extends in the vertical direction of the vehicle. The front wheel support member 52L supports the front wheel 14L in a rotatable manner.

At a lower end of the right knuckle arm 46R, a front wheel support member 52R is able to swing around an axial line through a swing center that extends in the vertical direction of the vehicle. The front wheel support member 52R supports the front wheel 14R in a rotatable manner.

The front wheel support members 52L and 52R rotate in a plan view as the handle 28 is operated. In this way, the saddle riding type vehicle 10 is able to turn to the left and right.

As shown in FIG. 2, the suspension 38 is connected to the linkage 36. The suspension 38 includes a cylinder 54 and a piston 56.

The cylinder 54 is attached to a right end of the upper right arm 42R through a bracket 60. Here, the bracket 60 is fixed to the upper right arm 42R. The cylinder 54 is able to swing relative to the bracket 60. Therefore, the cylinder 54 is able to swing relative to the upper right arm 42R. The cylinder 54 stores operating oil.

The piston 56 is attached to a left end of the upper left arm 42L through a bracket 58. Here, the bracket 58 is fixed to the upper left arm 42L. The piston 56 is able to swing relative to the bracket 58. Therefore, the piston 56 is able to swing relative to the upper left arm 42L.

The piston 56 is able to move in an axial direction of the cylinder 54. The piston 56 includes a main body (not shown) provided inside the cylinder 54. Upon receiving a vibration input that may change the relative position between the upper left arm 42L and the upper right arm 42R, the piston 56 advances/withdraws within the cylinder 54 to move in the axial direction of the cylinder 54. At that time, the movement of the main body of the piston 56 in the cylinder 54 produces a damping force. As a result, displacement vibrations in the linkage 36 are damped. For example, when vibrations in the same phase are generated in the upper left arm 42L and the upper right arm 42R, in other words, when vibrations in the same phase are generated in the pair of front wheels 14L and 14R, the vibrations are damped by the suspension 38.

As shown in FIG. 2, the damper 40 is attached to the linkage 36. The damper 40 includes a piston 62 and a cylinder 64. The piston 62 is attached to the lower left arm 44L in a swingable manner. The cylinder 64 is attached to the upper right arm 42R in a swingable manner.

Figure 3:
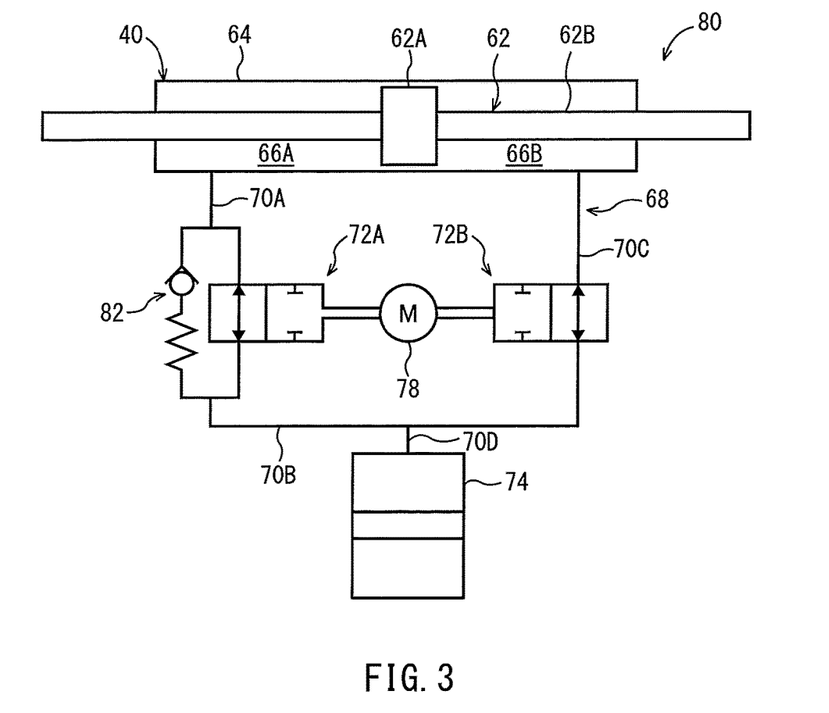
FIG. 3 is a diagram of a hydraulic circuit for a damper.

Referring to FIG. 3, a hydraulic circuit that controls the operation of the damper 40 will be described. FIG. 3 is a diagram of the hydraulic circuit for the damper 40.

The piston 62 includes a piston main body 62A and a piston rod 62B. The piston main body 62A is located at a center portion in an axial direction of the piston rod 62B. The piston main body 62A is able to move in the cylinder 64. The piston rod 62B extends through the cylinder 64 in the axial direction. More specifically, the damper 40 is preferably a so-called through-rod damper, for example.

The cylinder 64 stores operating oil. The inside of the cylinder 64 is partitioned into two spaces (a first space 66A and a second space 66B) by the piston main body 62A. The first and second spaces 66A and 66B are connected to each other by a damping circuit 68. The operating oil is able to therefore move between the first and second spaces 66A and 66B through the damping circuit 68.

The damping circuit 68 includes four flow paths 70A, 70B, 70C, and 70D, two flow regulators 72A and 72B, and one temperature compensating chamber 74. The flow regulator 72A is connected to the first space 66A through the flow path 70A. The flow regulator 72A is connected to the flow regulator 72B through the flow path 70B. The flow regulator 72B is connected to the second space 66B through the flow path 70C. The temperature compensating chamber 74 is connected to the flow path 70B through the flow path 70D.

The flow regulators 72A and 72B each include a valve element and a spring. The valve elements are positioned to block the flow paths in the flow regulators 72A and 72B by the energizing force of the springs. This prevents the operating oil from flowing in the damping circuit 66. In other words, the operation of the damper 40 is prevented. The prevention of the operation of the damper 40 prevents the operation of the linkage 36. More specifically, the linkage 36 attains a locked state.

An actuator 78 is, for example, a motor. The actuator 78 moves the valve element against the energizing force of the spring. At that time, the valve elements are in such a position that they do not block the flow paths in the flow regulators 72A and 72B. Therefore, the operating oil is allowed to flow in the damping circuit 66. In other words, the damper 40 is allowed to operate. When the operation of the damper 40 is thus allowed, vibrations are damped. When, for example, vibrations in opposite phases are generated in the lower left arm 44L and the upper right arm 42R, or when vibrations in opposite phases are generated in the pair of front wheels 14L and 14R, the vibrations are damped by the damper 40. When the operation of the damper 40 is allowed, the operation of the linkage 36 is allowed. In other words, the linkage attains an unlocked state.

As can be clearly understood from the above description, the damper 40, the damping circuit 66, and the actuator 78 define the lock 80.

Note that, in the example shown in FIG. 3, a relief valve 82 is arranged in parallel to the flow regulator 72A. The relief valve 82 prevents the internal pressure of the cylinder 64 from increasing when the operation of the damper 40 is prevented.

Figure 4:
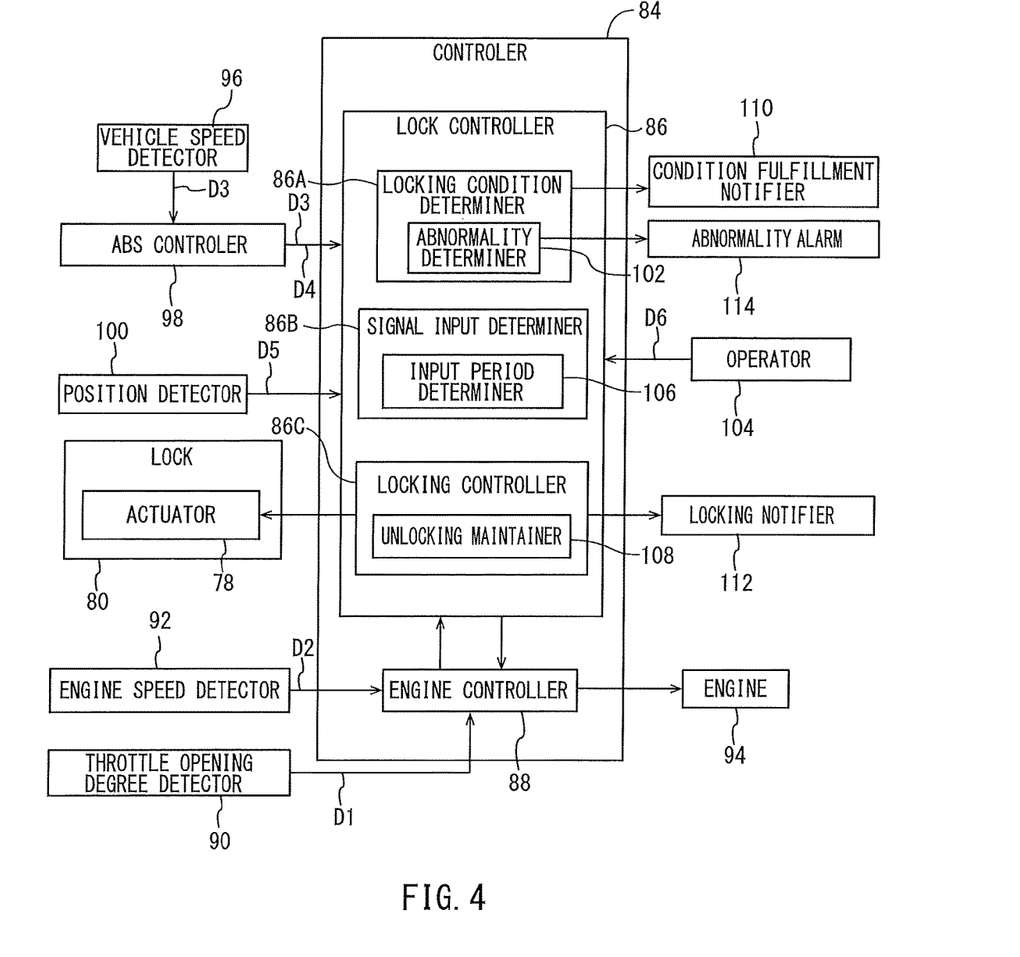
FIG. 4 is a block diagram for illustrating signals input/output to/from a controller.

Referring to FIG. 4, a controller 84 provided in the saddle riding type vehicle 10 will be described. FIG. 4 is a block diagram for illustrating signals input/output to/from the controller 84.

The controller 84 includes a lock controller 86 and an engine controller 88.

The lock controller 86 is configured or programmed to control locking and unlocking of the linkage 36 by the lock 80. The lock controller 86 is configured or programmed to include a locking condition determiner 86A, a signal input determiner 86B, and a locking controller 86C.

The locking condition determiner 86A determines whether a prescribed locking condition is fulfilled based on a throttle opening degree signal D1, an engine speed signal D2, a vehicle speed signal D3, a vehicle speed change rate signal D4, and a position signal D5. The locking condition will be described below.

The throttle opening degree signal D1 is output by a throttle opening degree detector 90 and represents a throttle opening degree. The throttle opening degree signal D1 is input to the lock controller 86 through the engine controller 88.

The engine speed signal D2 is output by an engine speed detector 92 and represents the speed of the engine 94. The engine speed signal D2 is input to the lock controller 86 through the engine controller 88.

The vehicle speed signal D3 is output by a vehicle speed detector 96 and represents a vehicle speed. The vehicle speed detector 96 includes, for example, a wheel speed sensor. According to the present preferred embodiment, the saddle riding type vehicle 10 includes an ABS (anti-lock braking system). Therefore, the vehicle speed signal D3 is input to the lock controller 86 through an ABS controller 98 that controls the operation of the ABS.

The vehicle speed change rate signal D4 is output by the ABS controller 98 and represents a vehicle speed change rate. More specifically, according to the present preferred embodiment, the ABS controller 98 defines a vehicle speed change rate detector.

The vehicle speed change rate may be, for example, a derivative value of a vehicle speed detected by the vehicle speed detector 96, i.e., an acceleration of the vehicle or the difference between vehicle speeds detected by the vehicle speed detector 96 at a first time point and a second time point (which occurs later than the first time point). If the vehicle speed change rate is obtained as the difference between vehicle speeds at first and second time points, an amount of computation required to obtain a vehicle speed change rate is reduced as compared to the case of obtaining a derivative value of a vehicle speed as a vehicle speed change rate.

The position signal D5 is output by a position detector 100 and represents the position of the valve elements provided in the flow regulators 72A and 72B. The position detector 100 determines whether the linkage 36 is locked. In short, the position detector 100 defines a state detector that detects the state of the linkage 36. When the valve elements are positioned to block the flow paths in the flow regulators 72A and 72B, the position detector 100 outputs a locked position signal D5 as the position signal D5. When the valve elements are positioned so that the flow paths in the flow regulators 72A and 72B are not blocked, the position detector 100 outputs an unlocked position signal D5 as the position signal D5. The position signal D5 is input to the lock controller 86. The position detector 100 detects the position of the valve elements included in the flow regulators 72A and 72B, for example, by directly detecting the position of these valve elements or by detecting the position of the actuator 78 as well as voltage that drives the actuator 78.

The locking condition determiner 86A includes an abnormality determiner 102. The abnormality determiner 102 determines whether an abnormality has occurred at detectors that detect the state of the vehicle, i.e., at the throttle opening degree detector 90, the engine speed detector 92, the vehicle speed detector 96, the position detector 100, and the ABS controller 98 that defines the vehicle speed change rate detector.

If any of the throttle opening degree detector 90, the engine speed detector 92, the vehicle speed detector 96, the position detector 100, and the ABS controller 98 that serves as the vehicle speed change rate detector has an abnormality, an abnormality alarm 114 included in the saddle riding type vehicle 10 informs or warns the rider about the abnormality. The warning from the abnormality alarm 114 continues until the abnormality is removed. The warning from the abnormality alarm 114 may be anything that is visibly or audibly recognized by the rider. The warning that is visibly recognizable by the rider may be made, for example, using a visual indicator. The indicator is, for example, located in a meter arranged near the handle 28. The warning that is audibly recognizable by the rider may be made using a speaker. The speaker is, for example, located in the meter arranged near the handle 28.

If the locking condition is fulfilled, the rider is notified of the fulfillment of the locking condition by a condition fulfillment notifier 110 provided in the saddle riding type vehicle 10. The notification by the condition fulfillment notifier 110 may continue, for example, until the linkage 36 attains a locked state or for a prescribed time period after the locking condition is fulfilled. The notification by the locking condition fulfillment notifier 110 may be anything that is visually or audibly recognizable by the rider similarly to the alarm from the abnormality alarm 114.

The signal input determiner 86B determines whether an operation signal is input while the locking condition is fulfilled. A result of determination by the locking condition determiner 86A and an operation signal D6 input to the lock controller 86 are used to make the determination.

The operation signal D6 is output by an operator 104. The operator 104 continues to output the operation signal D6 to the lock controller 86 when the rider carries out an operation. The operation signal D6 may be output continuously or intermittently. The operator 104 is positioned so that the rider is able to operate the operator while driving. The operator 104 includes, for example, an operation switch provided on the handle 28.

The signal input determiner 86B includes an input period determiner 106. The input period determiner 106 determines whether the operation signal D6 input upon the present fulfillment of the locking condition has continued since the previous fulfillment of the locking condition.

The locking controller 86C is configured or programmed to control the lock 80 to lock the linkage 36 if the operation signal D6 is input while the locking condition is fulfilled. A result of determination by the signal input determiner 86B is used to determine whether the operation signal D6 is input while the locking condition is fulfilled. According to the present preferred embodiment, the locking controller 86C is configured or programmed to control the lock 80 if the operation signal D6 input upon the present fulfillment of locking condition has not continued since the previous fulfillment of the locking condition. More specifically, the locking controller 86C drives the actuator 78 to move the valve elements included in the flow regulators 72A and 72B. In this way, the valve elements block the flow paths in the flow regulators 72A and 72B. As a result, the linkage 36 attains a locked state.

The locking controller 86C unlocks the linkage 36 if a prescribed unlocking condition is fulfilled. The unlocking condition may be, for example, the rider's operation of an unlocking switch or a failure of fulfillment of the locking condition. The unlocking switch may be, for example, the operator 104.

A locking notifier 112 included in the saddle riding type vehicle 10 notifies the rider of a locked state of the linkage 36. The notification by the locking notifier 112 continues, for example, until the vehicle stops. The notification by the locking notifier 112 may be anything that is visibly or audibly recognizable by the rider similarly to the alarm from the abnormality alarm 114 or the notification by the condition fulfillment notifier 110.

The locking controller 86C includes an unlocking maintainer 108. The unlocking maintainer 108 maintains an unlocked state of the linkage 36 by the lock 80 if the operation signal D6 input upon the present fulfillment of the locking condition has continued since the previous fulfillment of the locking condition.

Now, control carried out by the lock controller 86 to lock the linkage 36 (locking control by the lock controller 86) will be described.

The lock controller 86 is configured or programmed to control the lock 80 to lock the linkage 36 if the operation signal D6 has been input upon fulfillment of a locking condition under which the linkage 36 can be locked. For example, the locking condition is fulfilled if all of the following conditions 1 to 5 are satisfied.

Condition 1: The linkage 36 is in an unlocked state.
Condition 2: The present throttle opening degree is zero.
Condition 3: The present engine speed is lower than a prescribed engine speed.
Condition 4: The present vehicle speed is lower than a prescribed vehicle speed.
Condition 5: The present vehicle speed change rate is less than a prescribed vehicle speed change rate.

Figure 5:
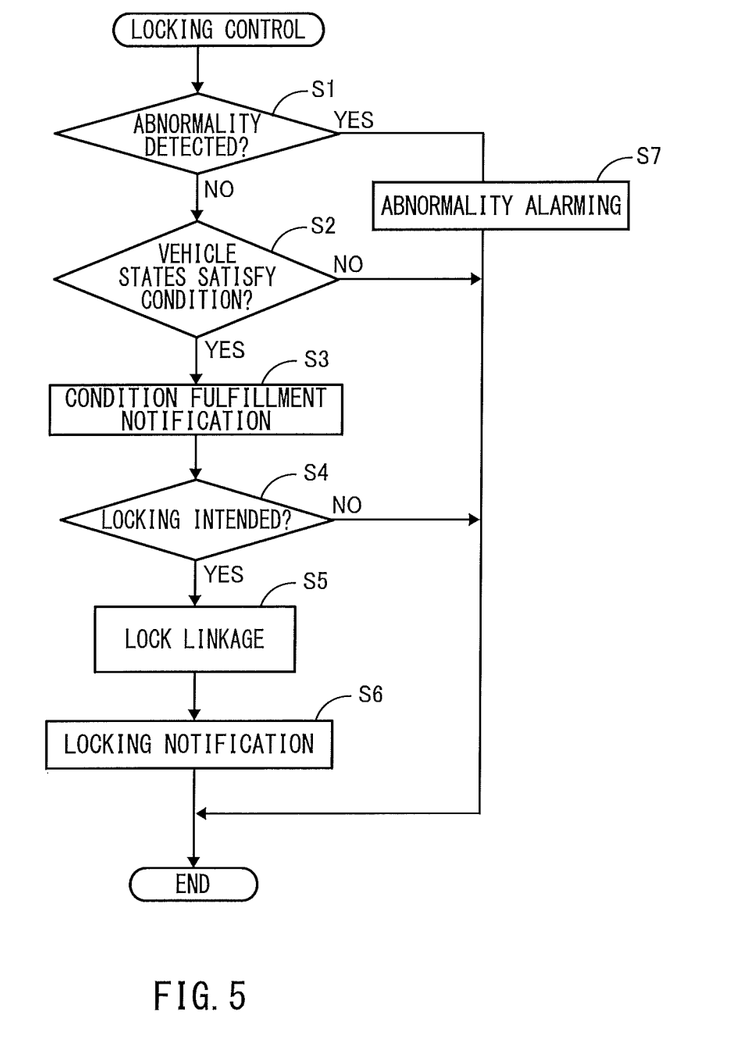
FIG. 5 is a flowchart for illustrating locking control by a lock controller.

Now, referring to FIG. 5, the locking control by the lock controller 86 will be described. FIG. 5 is a flowchart for illustrating the locking control by the lock controller 86.

First, the lock controller 86 (the abnormality determiner 102 to be specific) determines in step S1 whether an abnormality has occurred at the throttle opening degree detector 90, the engine speed detector 92, the vehicle speed detector 96, the position detector 100, and the ABS controller 98 as the vehicle speed change rate detector. The abnormality determiner 102 determines whether an abnormality has occurred based on signals input to the lock controller 86, in other words, based on outputs from the detectors 90, 92, 96, 100, and 98. More specifically, it is determined that an abnormality has occurred if outputs from the detectors 90, 92, 96, 100, and 98 are outside predetermined ranges or outputs from the detectors 90, 92, 96, 100, and 98 or do not change despite a control carried out to change these outputs.

If an abnormality has occurred (YES in step S1), the lock controller 86 outputs an alarm in step S7 about the ongoing abnormality. More specifically, the abnormality determiner 102 outputs an alarm about the abnormality through the abnormality alarm 114. Then, the lock controller 86 ends the locking control.

On the other hand, if an abnormality has not occurred (NO in step S1), the lock controller 86 determines the state of the vehicle in step S2. More specifically, the locking condition determiner 86A determines if the above-described conditions 1 to 5 are all satisfied.

The locking condition determiner 86A determines whether the linkage 36 is in an unlocked state by referring to an input position signal D5. If the unlocked position signal D5 is input, the condition 1 is satisfied.

The locking condition determiner 86A determines whether the present throttle opening degree is zero by referring to an input throttle opening degree signal D1. If the throttle opening degree is zero, in other words, if the throttle valve is closed, the condition 2 is satisfied.

The locking condition determiner 86A determines whether the present engine speed is lower than a prescribed engine speed (about 2500 rpm, for example) by referring to an input engine speed signal D2. Here, the prescribed engine speed is an engine speed at which the driving force of the engine is transmitted to the rear wheel 16 through a CVT (continuously variable transmission). If the present engine speed is lower than the prescribed engine speed, the condition 3 is satisfied. For example, the vehicle starts to move on a downward slope if the throttle is fully closed. Therefore, the vehicle state is preferably determined based on a condition other than the vehicle speed. Therefore, it is determined whether the condition 3 is satisfied.

The locking condition determiner 86A determines whether the present vehicle speed is lower than a prescribed vehicle speed (about 10 km/h, for example) by referring to an input vehicle speed signal D3. If the present vehicle speed is lower than the prescribed vehicle speed, the condition 4 is satisfied.

The locking condition determiner 86A determines whether the present vehicle speed change rate is less than a prescribed vehicle speed change rate (about 15%, for example) by referring to an input vehicle speed change rate signal D4. If the present vehicle speed change rate is less than the prescribed vehicle speed change rate, the condition 5 is satisfied. For example, if the throttle is fully closed, the vehicle speed change rate increases when the vehicle travels on a downward slope. It is determined if the condition 5 is satisfied so that the linkage 36 is not locked in such a case. For example, the average vehicle speed is calculated at intervals of several ms, for example, and if the difference between an immediately previously calculated average vehicle speed and the present calculated average speed is about 1 km/h, for example, and the state has not continued for about 100 ms, for example, it is determined that the present vehicle speed change rate is less than the prescribed vehicle speed change rate.

Unless at least one of the conditions 1 to 5 is satisfied, the lock controller 86 ends the locking control. On the other hand, if all of the conditions 1 to 5 are satisfied, the lock controller 86 notifies the rider of fulfillment of the locking condition in step S3. More specifically, the locking condition controller 68A notifies the rider of the fulfillment of the locking condition through the condition fulfillment notifier 110.

The lock controller 86 subsequently determines in step S4 whether the rider intends to lock the linkage 36. More specifically, the signal input determiner 86B determines whether an input condition is fulfilled. For example, the input condition is fulfilled when the following conditions 6 and 7 are both satisfied.

Condition 6: The operation signal D6 is input.
Condition 7: The operation signal D6 input upon the present fulfillment of the locking condition has not continued since the previous fulfillment of the locking condition.

The signal input determiner 86B determines whether the operation signal D6 is input. If the operation signal D6 is input, the condition 6 is satisfied.

Figure 6:
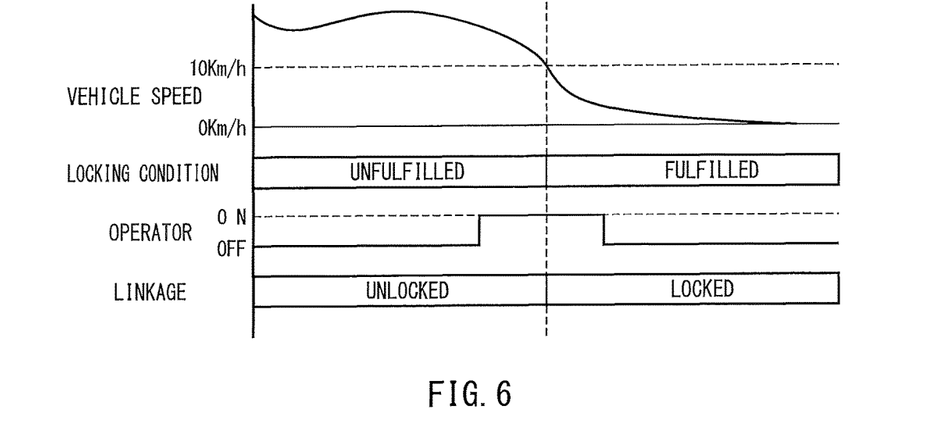
FIG. 6 is a timing chart for an operation signal input before fulfillment of a locking condition when a linkage is locked.
Figure 7:
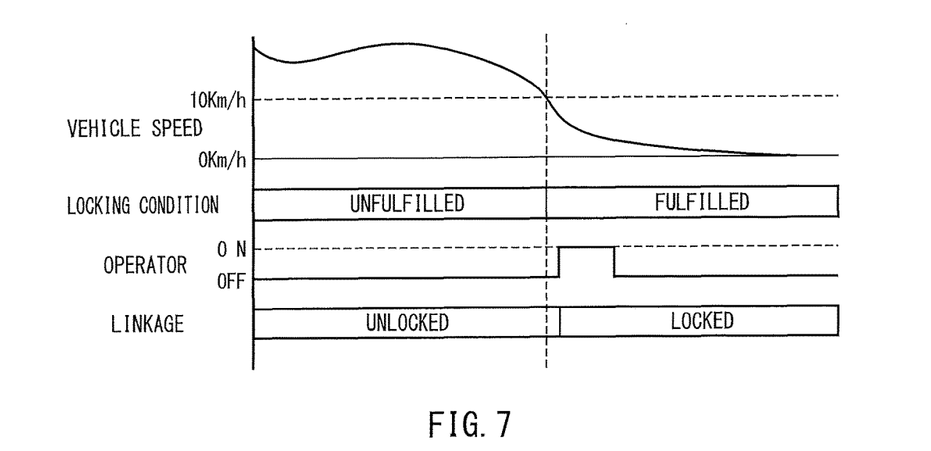
FIG. 7 is a timing chart for an operation signal input after fulfillment of a locking condition when the linkage is locked.

The operation signal D6 may be input before or after fulfillment of the locking condition as shown in FIG. 6 or FIG. 7. Note that in FIGS. 6 and 7, the linkage 36 attains a locked state when the locking condition is fulfilled. This indicates that the operation to lock the linkage 36 starts when the locking condition is fulfilled. In FIGS. 6 and 7, the linkage 36 is in an unlocked state when the locking condition is unfulfilled. This indicates that the operation to unlock the linkage 36 starts when the locking condition is unfulfilled.

Figure 8:
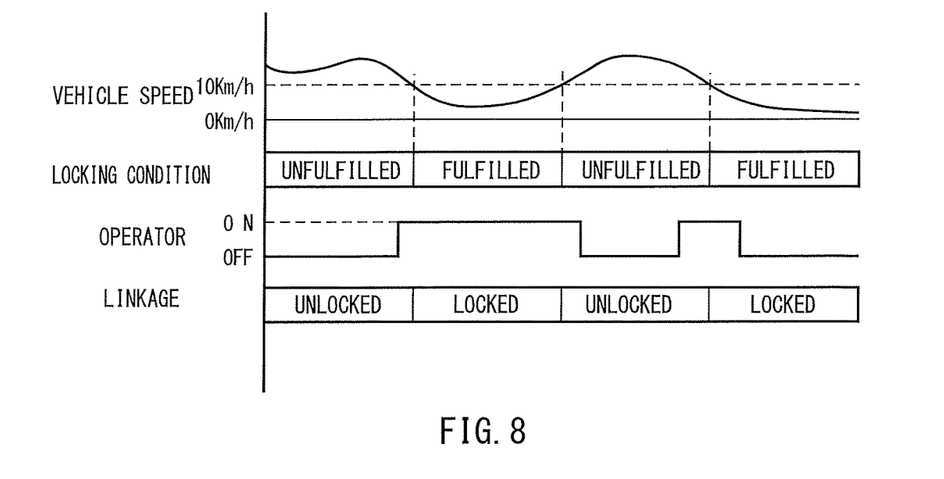
FIG. 8 is a timing chart showing how an operation signal input upon the present fulfillment of the locking condition has continued to be input since the previous fulfillment of the locking condition.
Figure 9:
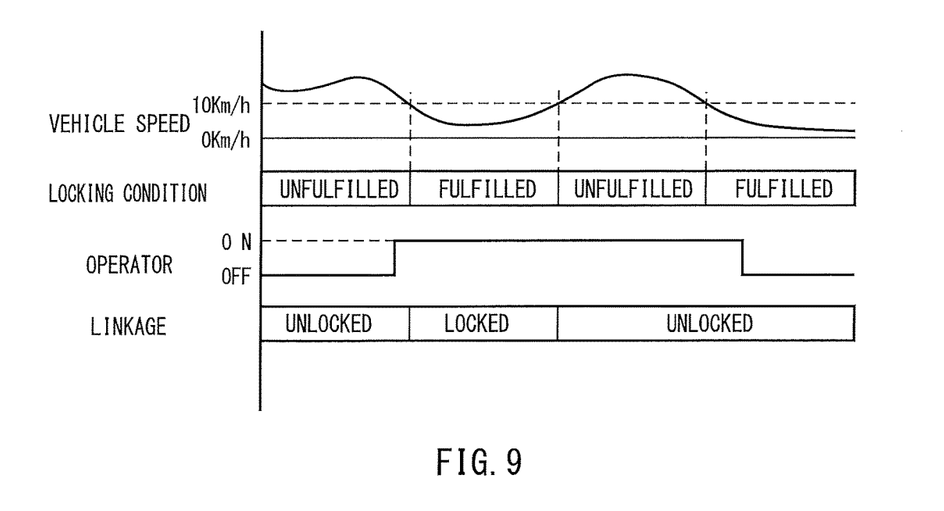
FIG. 9 is a timing chart showing how an operation signal input upon the present fulfillment of the locking condition has not continued to be input since the previous fulfillment of the locking condition.

The signal input determiner 86B (the input period determiner 106 to be specific) determines whether the operation signal D6 input upon the present fulfillment of the locking condition has continued since the previous fulfillment of the locking condition. As shown in FIG. 8, if the operation signal D6 input upon the present fulfillment of the locking condition has not continued since the previous fulfillment of the locking condition, the condition 7 is satisfied. On the other hand, as shown in FIG. 9, if the operation signal D6 input upon the present fulfillment of the locking condition has continued since the previous fulfillment of the locking condition, the condition 7 is not satisfied. In FIGS. 8 and 9, the linkage 36 is locked when the locking condition is fulfilled. This indicates that the operation to lock the linkage 36 starts when the locking condition is fulfilled. As shown in FIGS. 8 and 9, the linkage 36 is unlocked when the locking condition is unfulfilled. This shows that the operation to unlock the linkage 36 starts when the locking condition is unfulfilled.

If one of the conditions 6 and 7 is not satisfied, the lock controller 86 ends the locking control. On the other hand, if the conditions 6 and 7 are both satisfied, the lock controller 86 locks the linkage 36 in step S5. More specifically, the locking controller 86C drives the actuator 78 to lock the linkage 36.

The lock controller 86 subsequently notifies the rider of the locked state of the linkage 36 in step S6. More specifically, the locking controller 86C notifies the rider of the locked state of the linkage 36 through the locking notifier 112. Then, the lock controller 86 ends the locking control.

The saddle riding type vehicle 10 includes the vehicle body frame 12, the pair of front wheels 14L and 14R, the linkage 36, the lock 80, the lock controller 86, and the operator 104. The linkage 36 connects the pair of front wheels 14L and 14R to the vehicle body frame 12. The lock 80 locks the linkage 36 by preventing the operation of the linkage 36 and unlocks the linkage 36 by allowing the linkage 36 to operate. The lock controller 86 is configured or programmed to control locking and unlocking of the linkage 36 by the lock 80. The operator 104 continues to output the operation signal D6 to the lock controller 86 while the operation by the rider is input. The lock controller 86 controls the lock 80 to lock the linkage 36 if the operation signal D6 is input when the locking condition that allows the linkage 36 to be locked is fulfilled.

Since the operator 104 is provided, the intention of the rider is easily achieved. If the locking condition is fulfilled when the rider operates the operator 104, the rider is able to switch the linkage 36 from its unlocked state to its locked state by operating the operator 104. The operation signal D6 continues to be output while the operator 104 is operated. Therefore, if the rider operates the operator 104 before fulfillment of the locking condition (or when the locking condition is yet to be fulfilled), the linkage 36 is changed quickly from its unlocked state to its locked state once the locking condition is fulfilled.

In the saddle riding type vehicle 10, the lock controller 86 maintains the unlocked state of the linkage 36 by the lock 80 if the operation signal D6 input upon the present fulfillment of the locking condition has continued since the previous fulfillment of the locking condition. The rider is urged to stop operating the operator 104 after the linkage 36 is locked. This makes it easier to take into account and to perform control of the vehicle in accordance with the rider's intention.

The saddle riding type vehicle 10 further includes the locking notifier 112. The locking notifier 112 notifies that the linkage 36 is locked by the lock 80. In this way, the rider is made aware of the locked state of the linkage 36.

The saddle riding type vehicle 10 further includes the condition fulfillment notifier 110. In this way, the rider is made aware of fulfillment of the locking condition. Therefore, if the rider does not operate the operator 104 before fulfillment of the locking condition, the rider operates the operator at the appropriate time.

The saddle riding type vehicle 10 further includes the abnormality determiner 102. The abnormality determiner determines whether any of the plurality of detectors 90, 92, 96, 100, and 98 has an abnormality. If any of the detectors has an abnormality, it is not determined whether the locking condition is fulfilled. In this way, the locking condition is determined more precisely.

According to the above-described preferred embodiments, the condition 2 is preferably satisfied if the present throttle opening degree is zero, but the condition 2 may be satisfied if the present throttle opening degree is less or not more than a prescribed throttle opening degree. Alternatively, the condition 2 may be satisfied if the average throttle opening degree for a prescribed time period is less or not more than a prescribed engine speed.

According to the above-described preferred embodiments, the condition 3 is preferably satisfied if the present engine speed is less than a prescribed engine speed but the condition 3 may be fulfilled if the present engine speed is not more than the prescribed engine speed. Alternatively, the condition 3 may be satisfied if the engine speed is less than or not more than the prescribed engine speed for a prescribed time period. The condition 3 may be satisfied if the average engine speed for a prescribed time period is less or not more than the prescribed average engine speed.

According to the above-described preferred embodiments, the condition 4 is preferably satisfied if the present vehicle speed is lower than a prescribed vehicle speed, but the condition 4 may be satisfied if the present vehicle speed is not more than the prescribed vehicle speed. Alternatively, the condition 4 may be satisfied if the vehicle speed is lower or not more than the prescribed vehicle speed for a prescribed time period or the condition 4 may be satisfied if the average vehicle speed for a prescribed period is lower or not more than the prescribed average vehicle speed.

According to the above-described preferred embodiments, the condition 5 is preferably satisfied if the present vehicle speed change rate is less than a prescribed vehicle speed change rate, but the condition 5 may be satisfied if the present vehicle speed change rate is not more than the prescribed vehicle speed change rate. Alternatively, the condition 5 may be satisfied if the vehicle speed change rate is less or not more than the prescribed vehicle change rate for a prescribed time period or if the average vehicle speed change rate for a prescribed time period is less or not more than the prescribed vehicle speed change rate.

According to the above-described preferred embodiments, the locking condition is preferably fulfilled if all of the conditions 1 to 5 are satisfied, but the locking condition may be fulfilled if, for example, all of the conditions 1, 2, and 4 are satisfied.

According to the above-described preferred embodiments, the lock controller 86 preferably is configured or programmed to include the input period determiner 106 and the unlocking maintainer 108 but the lock controller 86 does not have to include these elements. More specifically, the input condition may be established if only the condition 6 is satisfied.

According to the above-described preferred embodiments, the vehicle speed signal D3 is preferably input to the lock controller 86 through the ABS controller 98 but the vehicle speed signal D3 may be input to the lock controller 86 not through the ABS controller 98.

According to the above-described preferred embodiments, the saddle riding type vehicle 10 preferably includes the condition fulfillment notifier 110 and the locking notifier 112 but the saddle riding type vehicle 10 does not have to include these elements.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle riding type vehicle comprising:
   a vehicle body frame;
   a pair of front wheels;
   a linkage that connects the pair of front wheels to the vehicle body frame;
   a lock that locks the linkage by preventing operation of the linkage and unlocks the linkage by allowing the linkage to operate;
   a controller that controls locking and unlocking of the linkage by the lock; and
   an operator that continues to output an operation signal to the controller while operation by a rider is being input;
   the controller controls the lock to lock the linkage when a locking condition that allows the linkage to be locked is fulfilled when the operation signal is input.

2. The saddle riding type vehicle according to claim 1, wherein the controller keeps the linkage in an unlocked state via the lock when the operation signal input upon a present fulfillment of the locking condition has continuously been input since a previous fulfillment of the locking condition.

3. The saddle riding type vehicle according to claim 1, further comprising a locking notifier that notifies the rider that the linkage is locked by the lock.

4. The saddle riding type vehicle according to claim 1, further comprising a condition fulfillment notifier that notifies the rider of fulfillment of the locking condition.

5. The saddle riding type vehicle according to claim 1, further comprising a detector that detects a vehicle state, wherein the controller includes:
   a locking condition determiner that determines whether the locking condition is fulfilled based on the vehicle state detected by the detector;
   a signal input determiner that determines whether the operation signal is input while the locking condition is fulfilled; and
   a locking controller that controls the lock to lock the linkage when the operation signal is input while the locking condition is fulfilled.

6. The saddle riding type vehicle according to claim 5, further comprising an abnormality determiner that determines whether the detector has an abnormality, wherein the locking condition determiner does not determine whether the locking condition is fulfilled when the detector has an abnormality.

7. The saddle riding type vehicle according to claim 5, wherein the signal input determiner includes an input period determiner that determines whether the operation signal input upon the present fulfillment of the locking condition has continuously been input since the previous fulfillment of the locking condition; and
   the locking controller includes an unlocking maintainer that keeps the linkage in an unlocked state via the lock when the operation signal input upon the present fulfillment of the locking condition has continuously been input since the previous fulfillment of the locking condition.

8. The saddle riding type vehicle according to claim 5, further comprising a plurality of the detectors, wherein the locking condition determiner determines whether the locking condition is fulfilled based on vehicle states detected by the plurality of detectors.

9. The saddle riding type vehicle according to claim 8, wherein the plurality of detectors include:
   a state detector that detects a state of the linkage;
   a throttle opening degree detector that detects a throttle opening degree; and
   a vehicle speed detector that detects a vehicle speed.

10. The saddle riding type vehicle according to claim 9, wherein the plurality of detectors further include an engine speed detector that detects an engine speed.

11. The saddle riding type vehicle according to claim 9, wherein the plurality of detectors further include a vehicle speed change rate detector that detects a vehicle speed change rate.

12. The saddle riding type vehicle according to claim 11, wherein the vehicle speed change rate detector outputs a difference between a vehicle speed detected by the vehicle speed detector at a first point in time and a vehicle speed detected by the vehicle speed detector at a second point in time as the vehicle speed change rate.

13. The saddle riding type vehicle according to claim 1, further comprising a damper that damps vibrations in opposite phases in the pair of front wheels, wherein the lock locks the linkage by preventing operation of the damper and unlocks the linkage by allowing the damper to operate.

* * * * *